US012292735B2

(12) United States Patent
Ito et al.

(10) Patent No.: US 12,292,735 B2
(45) Date of Patent: May 6, 2025

(54) INFORMATION PROCESSING APPARATUS AND INFORMATION PROCESSING METHOD

(71) Applicants: TOYOTA JIDOSHA KABUSHIKI KAISHA, Toyota (JP); DENSO TEN Limited, Hyogo (JP)

(72) Inventors: Noriaki Ito, Toyota (JP); Hiroki Kawasaki, Toyota (JP); Hiroto Nakagawa, Nagoya (JP); Satoru Ikeda, Hyogo (JP)

(73) Assignees: TOYOTA JIDOSHA KABUSHIKI KAISHA, Toyota (JP); DENSO TEN Limited, Hyogo (JP)

(*) Notice: Subject to any disclaimer, the term of this patent is extended or adjusted under 35 U.S.C. 154(b) by 290 days.

(21) Appl. No.: 17/948,761

(22) Filed: Sep. 20, 2022

(65) Prior Publication Data
US 2023/0092889 A1     Mar. 23, 2023

(30) Foreign Application Priority Data
Sep. 21, 2021   (JP) .................................. 2021-153654

(51) Int. Cl.
*G05D 1/00*    (2024.01)
*B60W 30/06*   (2006.01)
*H04W 76/10*   (2018.01)

(52) U.S. Cl.
CPC .......... *G05D 1/0022* (2013.01); *B60W 30/06* (2013.01); *H04W 76/10* (2018.02)

(58) Field of Classification Search
CPC .... G05D 1/0022; B60W 30/06; H04W 76/10; H04W 4/44; H04W 48/16; H04W 48/02; H04W 84/12
See application file for complete search history.

(56) References Cited

U.S. PATENT DOCUMENTS

| 9,992,735 B1* | 6/2018 | Crosbie ................. H04W 48/16 |
| 2003/0004613 A1* | 1/2003 | Hahn .................. B62D 15/0285 |
| | | 701/1 |
| 2013/0078980 A1 | 3/2013 | Saito |
| 2014/0200740 A1* | 7/2014 | Lavi ....................... G07C 5/008 |
| | | 701/2 |
| 2016/0277966 A1 | 9/2016 | Nagasaka et al. |
| 2017/0064745 A1* | 3/2017 | Kephart, Jr. .......... H04W 76/10 |
| 2018/0105165 A1* | 4/2018 | Alarcon ............. H04W 4/024 |
| 2018/0349715 A1 | 12/2018 | Gupta et al. |

(Continued)

FOREIGN PATENT DOCUMENTS

| EP | 3865360 A1 * | 8/2021 | ............ B60W 30/06 |
| JP | 2013-70230 A | 4/2013 | |
| JP | 2020-522783 A | 7/2020 | |

*Primary Examiner* — Jelani A Smith
*Assistant Examiner* — Alyssa Rorie
(74) *Attorney, Agent, or Firm* — Sughrue Mion, PLLC

(57) ABSTRACT

An information processing apparatus for controlling wireless communication performed by a vehicle, the information processing apparatus comprises a controller comprising at least one processor configured to perform, when detecting a predetermined access point, establish wireless connection with the predetermined access point, wherein the controller prevents wireless connection to the predetermined access point at least during a first period from when the vehicle stops until a predetermined timing comes.

17 Claims, 10 Drawing Sheets

(56) References Cited

U.S. PATENT DOCUMENTS

2021/0216794 A1   7/2021  Gupta et al.
2021/0216795 A1   7/2021  Gupta et al.
2022/0236702 A1*  7/2022  Nakayama ............... B60Q 9/00

* cited by examiner

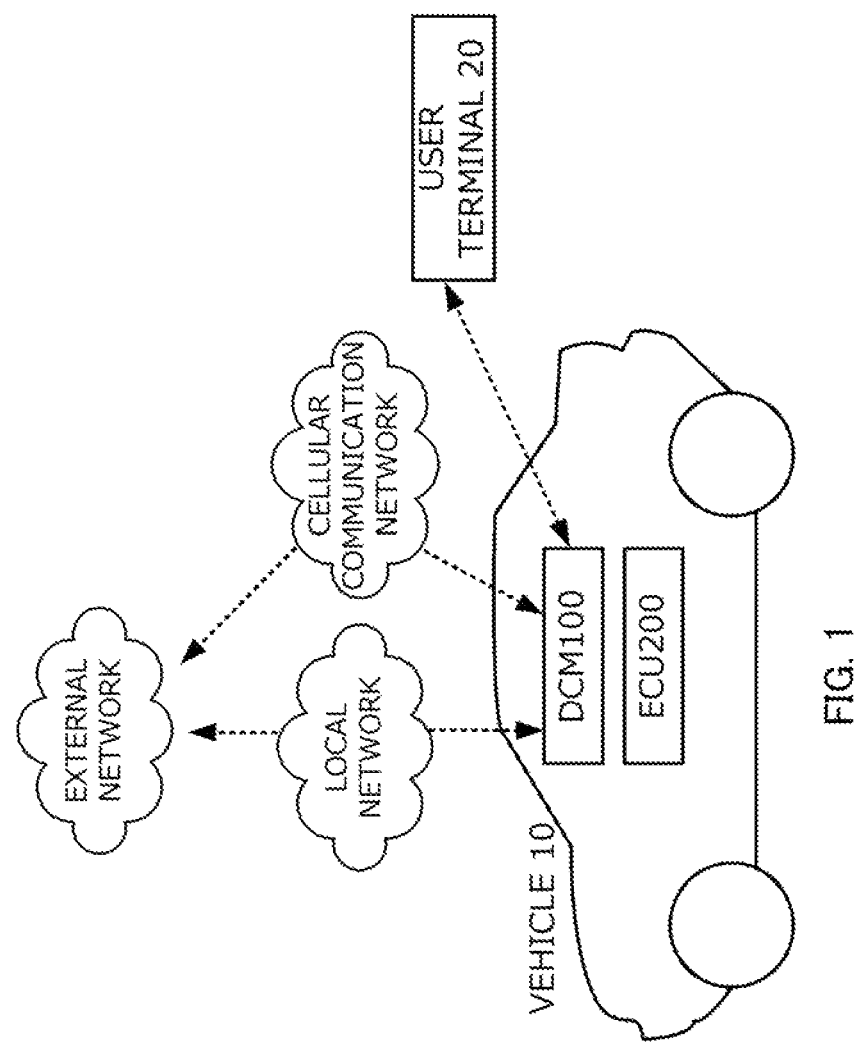

DETECT HOME NETWORK AND START CONNECTION

DISCONNECT

DISCONNECT FROM HOME NETWORK TO PERFORM REMOTE PARKING AND ACCEPT CONNECTION REQUEST FROM USER TERMINAL

EVEN IF DETECTING HOME NETWORK, STAND BY FOR CONNECTION FROM USER TERMINAL WITHOUT CONNECTING TO HOME NETWORK AT ONCE (SWITCH CONNECTION DESTINATION AFTER COMPLETION OF REMOTE PARKING)

INFORMATION PROCESSING APPARATUS AND INFORMATION PROCESSING METHOD

CROSS REFERENCE TO THE RELATED APPLICATION

This application claims the benefit of Japanese Patent Application No. 2021-153654, filed on Sep. 21, 2021, which is hereby incorporated by reference herein in its entirety.

BACKGROUND

Technical Field

The present disclosure relates to wireless communication.

Description of the Related Art

Automobiles capable of wireless network connection have come into widespread use.

For example, Japanese Patent Laid-Open No. 2020-522783 discloses an invention relating to a vehicle that, when detecting a predetermined access point, performs network connection via the access point.

SUMMARY

An object of the present disclosure is to enhance convenience for vehicle users.

The present disclosure in its one aspect provides an information processing apparatus for controlling wireless communication performed by a vehicle, the information processing apparatus comprising a controller comprising at least one processor configured to perform, when detecting a predetermined access point, establish wireless connection with the predetermined access point, wherein the controller prevents wireless connection to the predetermined access point at least during a first period from when the vehicle stops until a predetermined timing comes.

The present disclosure in its another aspect provides an information processing apparatus for controlling wireless communication performed by a vehicle, the information processing apparatus comprising a controller comprising at least one processor configured to, when detecting any of a plurality of access points, establish wireless connection with the access point, wherein the controller prevents, during a first period from a first timing of detecting a first access point included in the plurality of access points until a predetermined second timing comes, wireless connection to the first access point.

The present disclosure in its another aspect provides an information processing method executed by an information processing apparatus for controlling wireless communication performed by a vehicle, the information processing method comprising the steps of: when detecting a predetermined access point, establishing wireless connection with the predetermined access point; and preventing wireless connection to the predetermined access point at least during a first period from when the vehicle stops until a predetermined timing comes.

Another aspect of the present disclosure is a program for causing a computer to execute the above information processing method or a computer-readable storage medium that non-transitorily stores the program.

According to the present disclosure, it is possible to enhance convenience for vehicle users.

BRIEF DESCRIPTION OF THE DRAWINGS

FIG. 1 is a schematic diagram of a vehicle system according to a first embodiment;

DESCRIPTION OF THE EMBODIMENTS

Figure 2A:
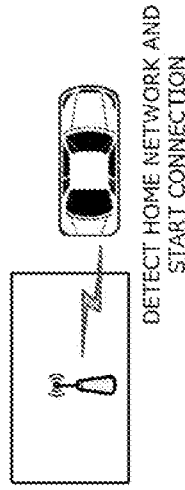
FIGS. 2A to 2C are diagrams illustrating switching of a connection destination.

Recently, automobiles capable of wireless network connection have come into widespread use. By an in-vehicle apparatus providing network connection, services of supporting a driver in an emergency and services relating to security can be provided. Such an apparatus is also called a data communication module (DCM).

A DCM capable of connecting to a local network using not only cellular communication but also a communication standard such as Wi-Fi (registered trademark) is known. By using such a DCM, it becomes possible to download a large amount of data such as map data and software used by an in-vehicle terminal.

There exists a DCM capable of providing various kinds of functions by performing direct connection with a user terminal using Wi-Fi or the like. One of such functions is a remote parking function. The remote parking function is a function of causing a vehicle to automatically enter a predetermined parking space via a user terminal.

For example, a vehicle user gets off a vehicle and makes a movement instruction via a user terminal while checking safety around the vehicle. The vehicle decides a trajectory for entering a predetermined parking space and moves forward and backward at a low speed while controlling steering, based on the movement instruction received from the user terminal. Thereby, it becomes possible to cause the vehicle to easily enter the parking space.

Such a DCM is configured to be capable of switching between two kinds of modes, a mode for connecting to an access point and a mode for accepting connection from a user terminal. However, if selection of a mode is not appropriately performed, usability may be impaired.

Consideration will be made, for example, on a case where, when a wireless home network has been constructed in a vehicle owner's home, a vehicle comes back home. When detecting the home network, the DCM starts connection to an access point, and starts communication as necessary. There may be a case where the vehicle owner tries to connect the user terminal to the DCM to execute remote parking after the arrival.

In such a case, the DCM has to interrupt the connection to the home network and newly connect to the user terminal. However, in a case where it is not possible to interrupt the connection at once, such as a case where data download has already started, connection to the user terminal cannot be performed at once, and waiting time occurs. Furthermore, re-execution of a sequence process, retry of connection and the like occur, and there is also a possibility of increase in power consumption and deterioration of service response.

An information processing apparatus according to the present disclosure solves such a problem.

An information processing apparatus according to an aspect of the present disclosure is an information processing apparatus for controlling wireless communication performed by a vehicle, the information processing apparatus comprising a controller configured to, when detecting a predetermined access point, establish wireless connection with the predetermined access point, wherein the controller prevents wireless connection to the predetermined access point at least during a first period from when the vehicle stops until a predetermined timing comes.

The vehicle according to the present disclosure performs wireless communication using a wireless communication standard, for example, IEEE802.11.

The predetermined access point is, typically, an access point that can be used at a place where there is a possibility that a wireless connection request from another terminal (a user terminal or the like) occurs. When the vehicle stops at such a place, the information processing apparatus prevents connection to the access point until the predetermined timing comes. Thereby, it becomes possible to smoothly accept a wireless connection request from another terminal.

The first period is a period during which automatic connection to an access point is prevented. The first period may be started at a timing when the vehicle stops or may be started at a timing before the vehicle stops. Further, the first period may expire at a timing when remote parking control of the vehicle ends or may expire when acceptance of wireless connection from the user terminal times out.

The remote parking control is control to cause a vehicle to enter a parking space by automatically controlling steering of the vehicle.

Further, an information processing apparatus according to another aspect of the present disclosure is an information processing apparatus for controlling wireless communication performed by a vehicle, the information processing apparatus comprising a controller configured to, when detecting any of a plurality of access points, establish wireless connection with the access point, wherein the controller prevents, during a first period from a first timing of detecting a first access point included in the plurality of access points until a predetermined second timing comes, wireless connection to the first access point.

The first access point is, typically, an access point that can be used at a place where there is a possibility that a wireless connection request from another terminal (a user terminal or the like) occurs. When detecting such an access point, the information processing apparatus may prevent connection to the access point until a predetermined timing comes.

Specific embodiments of the present disclosure will be described below based on drawings. A hardware configuration, a module configuration, a functional configuration and the like described in each embodiment are not intended to limit the technical scope of the disclosure only thereto unless otherwise stated.

First Embodiment

An overview of a vehicle system according to a first embodiment will be described with reference to FIG. 1. The vehicle system according to the present embodiment is configured including a vehicle 10 and a user terminal 20.

The vehicle 10 is a connected car having a function of communicating with an external network. The vehicle 10 is configured including a DCM (data communication module) 100 and an electronic control unit 200 (also referred to as an ECU). Though a single ECU 200 is exemplified in FIG. 1, the vehicle 10 may include a plurality of ECUs 200.

The DCM 100 is an apparatus that performs wireless communication with an external network. The DCM 100 functions as a gateway for connecting a component that the vehicle 10 has (hereinafter, a vehicle component) to an external network. For example, the DCM 100 provides access to an external network for the ECU 200 that the vehicle 10 has. Thereby, the ECU 200 can communicate with an external apparatus connected to the network via the DCM 100.

The DCM 100 is configured to be communicable via a cellular communication network and a local network.

The cellular communication network is a communication network using a cellular network. The DCM 100 stores information about a cellular communication contract. When detecting an available cellular communication network, the DCM 100 attaches to the cellular communication network.

The local network is such a network that connection thereto is provided at a predetermined access point, for example, a home network or a public wireless LAN network. For example, in the case of using a home network constructed in a home as the local network, the vehicle 10 can perform communication within a predetermined range around the home. The DCM 100 stores information about a plurality of access points. When detecting an available access point, the DCM 100 connects to the access point.

The user terminal 20 is a computer that a driver of the vehicle possesses. The user terminal 20 is a small-sized computing device such as a smartphone, a tablet computer or a wearable computer. In the vehicle system according to the present embodiment, the user terminal 20 can provide a remote parking function by wirelessly connecting to the DCM 100.

Figure 2B:
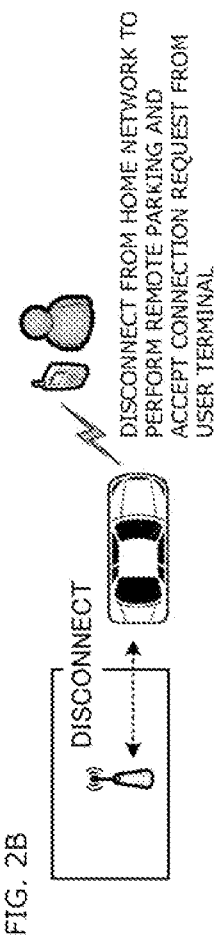

Next, characteristics of the DCM 100 in the present embodiment will be described with reference to FIGS. 2A to 2C.

Here, it is assumed that a home network is constructed in a home of an owner of the vehicle 10. For example, if the vehicle 10 is in a parking lot of the owner's home, the DCM 100 can connect to an external network via the home network. Thereby, each component that the vehicle 10 has can perform download of data used during travel (for example, music or video, electronic mails, traffic information, road map data or the like), update of software and the like (FIG. 2A).

Immediately after the vehicle 10 arrives home, a connection request may be issued from the user terminal 20 to the DCM 100 to execute the remote parking function.

However, if the DCM 100 mounted on the vehicle 10 connects to the home network first, it becomes impossible for the DCM 100 to respond to the connection request from the user terminal at once. This is because, for example, a procedure of (1) the DCM 100 disconnecting the connection with the local network in response to the connection request transmitted from the user terminal 20 and (2) the DCM 100 accepting connection from the user terminal 20 is required (FIG. 2B). Furthermore, if the DCM 100 has been performing transmission/reception of data via the home network, more time may be required to suspend the transmission/reception.

Figure 2C:
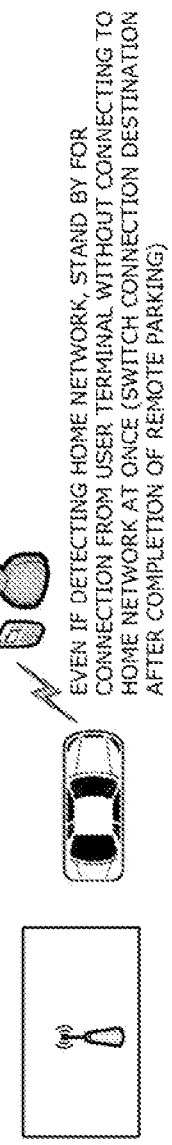

Therefore, before the vehicle 10 arrives home, the DCM 100 according to the present embodiment prevents automatic connection to an access point and transitions to a mode for standing by for connection from the user terminal 20 (FIG. 2C). This mode is released when entry by remote parking is completed or when standby for connection times out.

Thereby, it becomes possible to cause remote parking to be smoothly performed after the vehicle 10 arrives home. A specific method will be described later.

Figure 3:
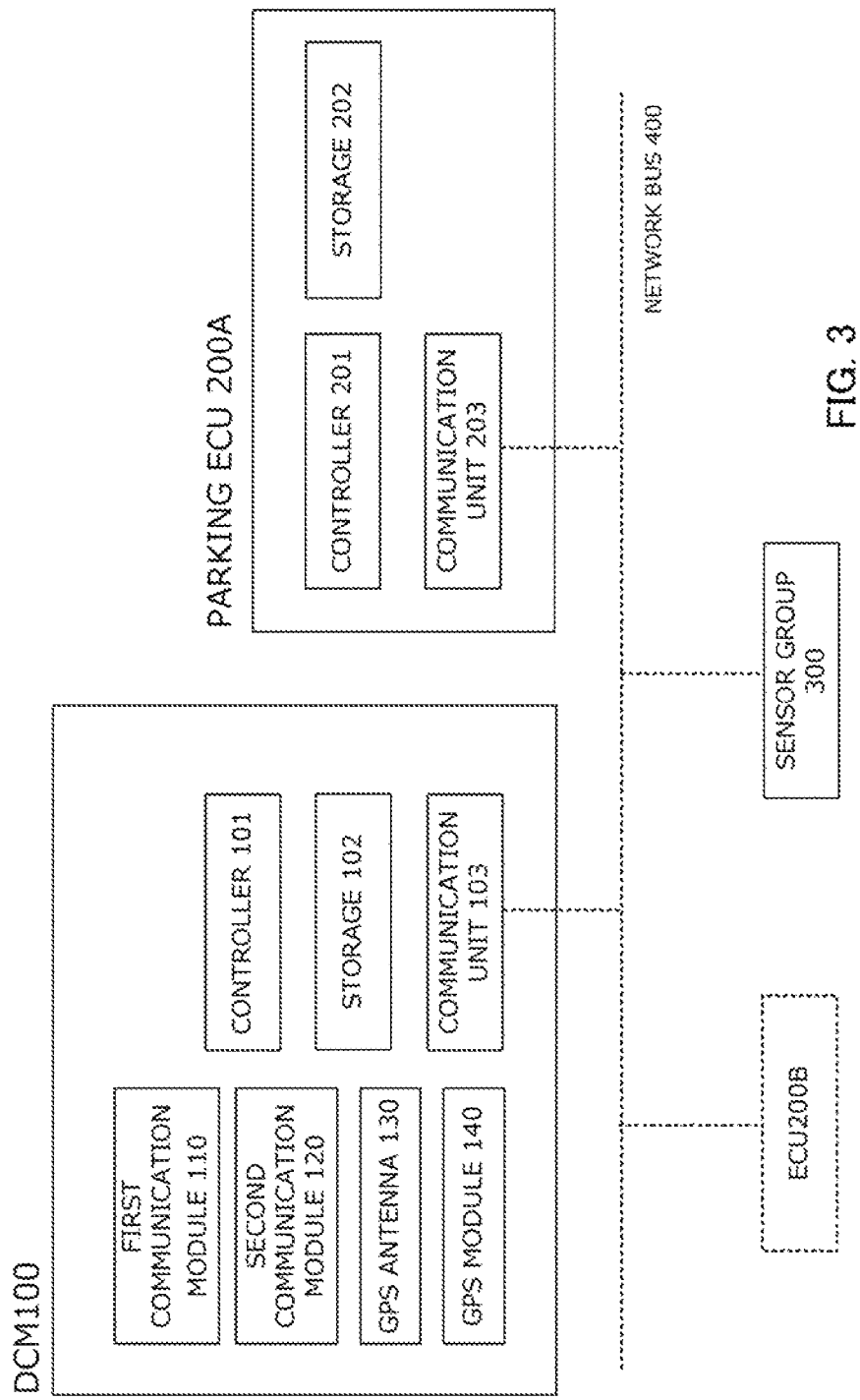
FIG. 3 is a diagram illustrating components that a vehicle according to the first embodiment has.

FIG. 3 is a diagram illustrating components that the vehicle 10 according to the present embodiment has. The vehicle 10 according to the present embodiment is configured including the DCM 100, a plurality of ECUs 200A, 200B, . . . (hereinafter generically referred to as the ECUs 200) and a sensor group 300.

The ECUs 200 may include a plurality of ECUs responsible for different vehicle components. As the plurality of ECUs, for example, a body ECU, an engine ECU, a hybrid ECU, a power train ECU and the like can be exemplified.

In the present embodiment, a parking ECU 200A is exemplified as an ECU 200 that provides the remote parking function.

The sensor group 300 includes a plurality of sensors (a distance sensor, an image sensor and the like) used in the remote parking function. The plurality of sensors may be installed at a plurality of positions of a vehicle body.

The DCM 100 is configured having a first communication module 110, a second communication module 120, a GPS antenna 130, a GPS module 140, a controller 101, a storage 102 and a communication unit 103.

The first communication module 110 is a communication module that performs communication with the outside by cellular communication. The first communication module 110 is configured including antenna elements that perform input/output of wireless signals. In the present embodiment, the antenna elements are those that are in conformity with mobile communication (for example, 3G, LTE, 5G and the like).

The second communication module 120 is a communication module that performs communication with the outside based on a standard for communication other than cellular communication. As communication standards that the second communication module 120 can adopt, Wi-Fi, DSRC (Dedicated Short Range Communications), millimeter wave communication and the like can be exemplified. The second communication module 120 is configured including antenna elements that perform input/output of wireless signals, similarly to the first communication module. The antenna may be configured including a plurality of physical antennas. For example, in the case of performing communication using high frequency band radio waves such as microwaves or millimeter waves, the plurality of antennas may be distributedly arranged to stabilize the communication.

In the present embodiment, the second communication module 120 performs communication using Wi-Fi.

The second communication module 120 is configured to be operational in any of a mode for performing connection to an access point as a client and a mode for accepting connection from another apparatus as a server. The former is referred to as a client mode, and the latter is referred to as a server mode. In the case of operating in the client mode, it becomes possible to access to an external network via an access point. In the case of operating in the server mode, it is possible to directly connect to the user terminal 20 to execute the remote parking function.

The GPS antenna 130 is an antenna that receives a positioning signal transmitted from a positioning satellite (also referred to as a GNSS satellite).

The GPS module 140 is a module that calculates position information based on a signal received by the GPS antenna 130.

The controller 101 is an arithmetic unit that realizes various kinds of functions of the DCM 100 by executing a predetermined program. The controller 101 may be realized, for example, by a CPU or the like.

The controller 101 executes a function of connecting to an external network via either a cellular communication network or a local network.

The controller 101 executes a function of mediating communication made between an external network and a component that the vehicle 10 has (a vehicle component). For example, when a certain vehicle component requires communication with an external network, the controller 101 executes a function of relaying data transmitted from the vehicle component to the external network. Further, the controller 101 executes a function of receiving data transmitted from the external network and transferring the data to an appropriate vehicle component.

Furthermore, the controller 101 can execute functions specific to the DCM 100. For example, the controller 101 is configured to be capable of executing monitoring and telephone conversation functions of a security system and can make a security report, an emergency report and the like based on a trigger that has occurred in the vehicle 10.

The storage 102 is a memory device that includes a main memory and an auxiliary memory. In the auxiliary memory, an operating system (OS), various kinds of programs, various kinds of tables and the like are stored. By loading a program stored therein to the main memory and executing the program, each function meeting a predetermined purpose as described later can be realized.

The communication unit 103 is an interface unit for connecting the DCM 100 to an in-vehicle network. In the present embodiment, the plurality of vehicle components including the ECUs 200 are mutually connected via a bus of the in-vehicle network. As a standard of the in-vehicle network, for example, CAN (Controller Area Network) can be exemplified. When the in-vehicle network is such that uses a plurality of standards, the communication unit 103 may have a plurality of interface devices corresponding to standards of communication destinations. As a communication standard other than CAN, for example, Ethernet (registered trademark) can be exemplified.

The DCM 100 may be configured to be operational independent from the other components that the vehicle 10 has. For example, the DCM 100 may internally include an auxiliary battery so as to be operational alone without depending on an external power source. According to such a configuration, even if another component of the vehicle 10 malfunctions (for example, a power supply malfunction) due to a traffic accident or the like, it is possible to make an emergency report and the like.

Figure 4:
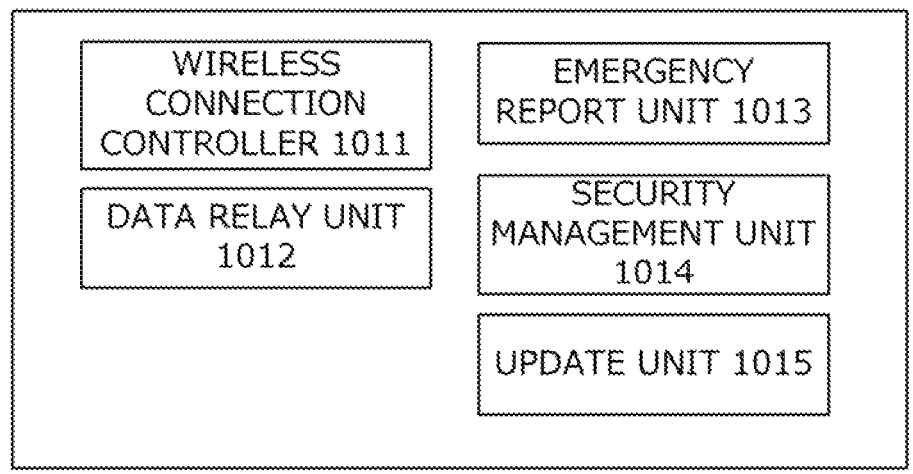
FIG. 4 is a schematic diagram illustrating function modules that a controller 101 has.

Next, functions executed by the controller 101 will be described. FIG. 4 is a schematic diagram illustrating function modules that the controller 101 has. Each of the function modules that the controller 101 has can be realized by executing a program stored in storage such as a ROM by the controller 101.

A wireless connection controller 1011 controls wireless connection using the first communication module 110 and the second communication module 120. The wireless connection controller 1011 manages information required for wireless connection, and performs connection to a cellular communication network and a local network via the first communication module 110 and the second communication module 120 under a situation where the networks are available.

In the case of performing communication using the second communication module 120, the wireless connection controller 1011 selects an operation mode from between the server mode and the client mode. A specific method will be described later.

A data relay unit 1012 relays data transmitted/received between vehicle components. For example, the data relay unit 1012 executes a process of receiving a message sent out by a first apparatus connected to the in-vehicle network and, when necessary, transferring the message to a second apparatus connected to the in-vehicle network. The first and second apparatuses may be ECUs 200 or may be other vehicle components.

When receiving a message addressed to an external network from a vehicle component, the data relay unit 1012 relays the message to the external network. Further, the data relay unit 1012 receives data transmitted from an external network and transfers the data to an appropriate vehicle component.

When an abnormal situation occurs on the vehicle 10, an emergency report unit 1013 makes an emergency report to an operator outside the vehicle 10. As an example of the abnormal situation, occurrence of a traffic accident or a vehicle breakdown is given. When a predetermined trigger, for example, a call button provided in the vehicle 10 being pressed or an airbag being developed occurs, the emergency report unit 1013 starts connection with the operator and enables telephone conversation between the driver of the vehicle and the operator. At the time of making the emergency report, the emergency report unit 1013 may transmit position information about the vehicle to the operator. In this case, the emergency report unit 1013 may acquire the position information from the GPS module 140.

A security management unit 1014 performs a security monitoring process. The security management unit 1014 detects that the vehicle has been unlocked not by a regular procedure, based on data received from an ECU 200 that is responsible for electronic lock of the vehicle, and transmits a security report to a predetermined apparatus. The security report may include position information about the vehicle. In this case, the security management unit 1014 may acquire the position information from the GPS module 140. When determining that a security problem of the vehicle 10 has occurred, the security management unit 1014 may acquire the position information and periodically transmit the acquired position information to an external apparatus specified in advance.

An update unit 1015 updates software used by the DCM 100 or the electronic control units (the ECUs 200) that the vehicle 10 has. For example, the update unit 1015 manages versions of pieces of firmware stored in the plurality of ECUs 200, and, when new firmware is provided by an external apparatus, the update unit 1015 downloads the firmware via a network and executes a process of applying the firmware to a target apparatus.

Though the emergency report function, the security function and the software update function have been given as specific functions provided by the DCM 100 here, functions that the DCM 100 has may include other functions. For example, it is possible to cause the DCM 100 to have a function of performing driving diagnosis, a function of monitoring a state of a driver, a function of performing energy management and the like.

Next, the parking ECU 200A will be described.

The parking ECU 200A is an electronic control unit that executes the remote parking function based on a request transmitted from the user terminal 20.

The ECU can be configured as a computer having a processor such as a CPU or a GPU, a main memory such as a RAM and a ROM, and an auxiliary memory such as an EPROM, a disk drive and a removable medium, similarly to the DCM 100.

The parking ECU 200A is configured including a controller 201, a storage 202 and a communication unit 203.

The controller 201 is an arithmetic unit (a processor) that realizes various kinds of functions of the parking ECU 200A by executing a predetermined program. The storage 202 is a memory device that includes the main memory and the auxiliary memory.

The communication unit 203 is a communication interface that connects the parking ECU 200A to the in-vehicle network. The communication unit 203 executes a process of transmitting a message in a predetermined format generated by the controller 201 to the network bus and a process of transmitting a message received from the network bus to the controller 201.

Figure 5:
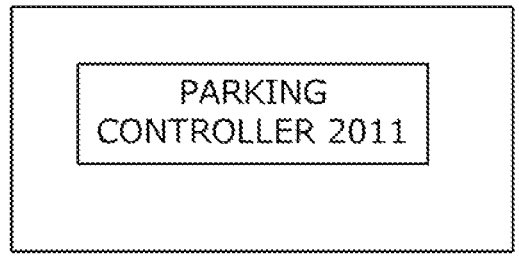
FIG. 5 is a schematic diagram illustrating function modules that a controller 201 has.

FIG. 5 is a schematic diagram illustrating function modules that the controller 201 has. Each of the function modules that the controller 201 has can be realized by executing a program stored in storage such as the ROM by the controller 201.

A parking controller 2011 generates an instruction to cause the vehicle to enter a predetermined area (for example, a forward/backward movement instruction or a steering instruction) based on sensor data acquired from the plurality of sensors included in the sensor group 300, and transmits the instruction to a component that manages driving of the vehicle 10 (for example, another ECU The network bus is a communication bus constituting the in-vehicle network. Though one bus is illustrated in this example, the vehicle 10 may have two or more communication buses. The plurality of communication buses may be mutually connected by the DCM 100 or a gateway that gathers the plurality of communication buses.

Figure 6:
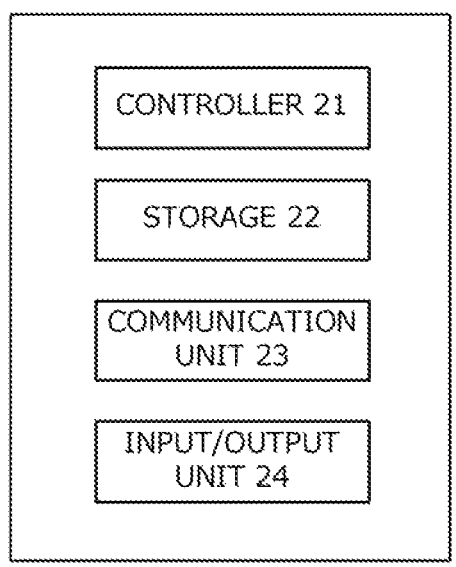
FIG. 6 is a diagram illustrating components that a user terminal has.

Next, the user terminal 20 will be described. FIG. 6 is a schematic diagram illustrating a configuration of the user terminal 20 in the present embodiment.

The user terminal 20 is a computer associated with a user. The user terminal 20 is, typically, a terminal that a driver of the vehicle possesses. The driver of the vehicle can communicate with the parking ECU 200A via the user terminal 20 to cause the vehicle 10 to perform the remote parking function.

The user terminal 20 is a computer, for example, a personal computer, a smartphone, a mobile phone, a tablet computer, or a personal information terminal. The user terminal 20 is configured including a controller 21, a storage 22, a communication unit 23 and an input/output unit 24.

The controller 21 is a unit responsible for control of the user terminal 20. The controller 21 executes, for example, a process of transmitting a request to the parking ECU 200A, a process of performing interaction with the parking ECU 200A, and the like. The controller 21 may generate a GUI to be presented to the user based on information transmitted from the parking ECU 200A.

The controller 21 is configured, for example, with a microcomputer. The controller 21 may realize each of the above functions by executing a program stored in storage (such as the ROM) by a CPU.

The storage 22 is configured including a main memory and an auxiliary memory. The main memory is a memory where programs executed by the controller 21 and data used by the control program are developed. The auxiliary memory is a device where the programs executed by the controller 21 and the data used by the control programs are stored. In the auxiliary memory, what is obtained by packaging the programs executed by the controller 21 as an application may be stored. An operating system for executing such an application may be stored. By a program stored in the auxiliary memory being loaded to the main memory and executed by the controller 21, each process described below is performed.

As the main memory, a RAM (random access memory) and a ROM (read-only memory) may be included. Further, as the auxiliary memory, an EPROM (erasable programmable ROM) and a hard disk drive (HDD) may be included. Furthermore, as the auxiliary memory, a removable medium, that is, a removable recording medium may be included.

The communication unit 23 is a module that performs wireless communication with the DCM 100. In the present embodiment, the communication unit 23 can use the Wi-Fi standard to perform communication with the DCM 100.

The communication unit 23 may also serve as a communication interface for communicating with a wide area network such as the Internet. For example, the communication unit 23 may include a communication module for performing cellular communication.

The input/output unit 24 is a unit that accepts an input operation performed by the user and presents information to the user. The input/output unit 24 is configured, for example, with one touch panel display. The input/output unit 24 may be configured with a liquid crystal display and control unit therefor and a touch panel and control unit therefor.

Figure 7:
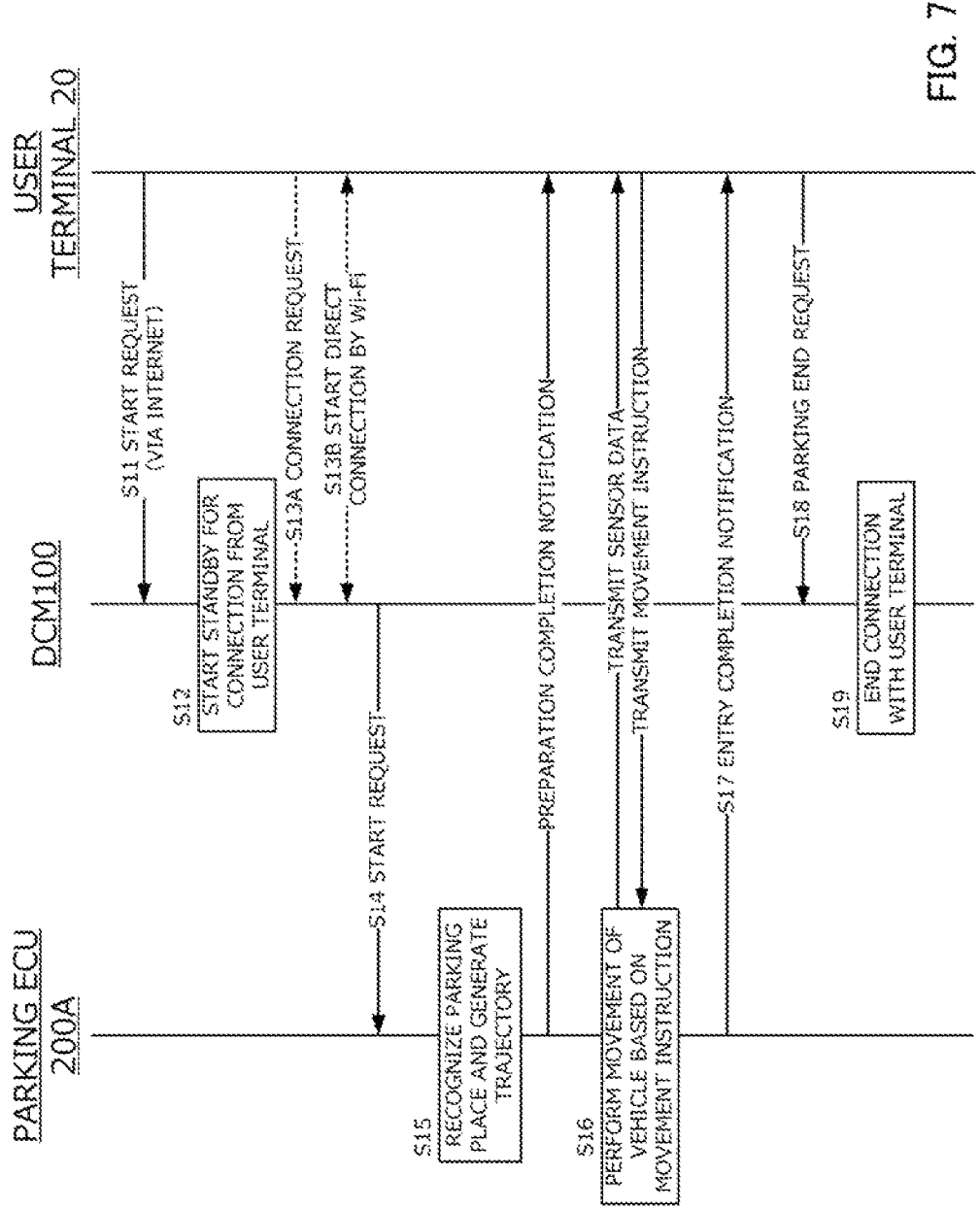
FIG. 7 is a dataflow diagram at the time of executing remote parking.

Next, description will be made on a process of the user terminal 20 executing remote parking by performing interaction with the parking ECU 200A. FIG. 7 is a flowchart illustrating an overview of the process. The illustrated flow is started when an operation of requesting remote parking is performed by the user terminal 20.

First, at step S11, the user terminal 20 transmits a request to the effect that remote parking is to be started, to the DCM 100. When the DCM 100 is operating in the client mode, the DCM 100 cannot directly accept the request from the user terminal 20. Therefore, at this step, communication between the user terminal 20 and the DCM 100 is performed via a wide area network such as the Internet. When the DCM 100 is operating in the server mode, the process of steps S11 to S12 may be omitted.

Receiving the request, the DCM 100 switches the operation mode to the server mode to start standby for connection from the user terminal at step S12. At this timing, existing connection to the local network is disconnected.

Next, the user terminal 20 issues a connection request to the DCM 100 at step S13A, and starts direct connection by Wi-Fi at step S13B. Further, a communication route via the DCM 100 is established between the user terminal 20 and the parking ECU 200A, and a start request is transmitted to the parking ECU 200A (step S14).

At step S15, the parking ECU 200A recognizes a place where the vehicle 10 is to be parked and generates a necessary trajectory. For example, the parking ECU 200A (the parking controller 2011) recognizes a space for the vehicle 10 to enter, based on sensor data acquired from the distance sensor and the image sensor included in the sensor group 300.

The space for the vehicle 10 to enter may be recognized based on an instruction transmitted from the user terminal 20. For example, the parking ECU 200A may transmit an image around the vehicle acquired by the image sensor to the user terminal 20 so that the user specifies a space to cause the vehicle 10 to enter, on the image.

Then, the parking ECU 200A generates a trajectory for entering the space. The trajectory may include quick turns. When the process is completed, the parking controller 2011 transmits a preparation completion notification to the user terminal 20.

At step S16, the parking controller 2011 causes the vehicle 10 to move based on an instruction from the user terminal 20. At this step, the user terminal 20 periodically transmits a movement instruction to the parking ECU 200A. The parking ECU 200A performs movement of the vehicle on condition that a movement instruction is periodically received. Thereby, the vehicle 10 moves along the decided trajectory.

Figure 8:
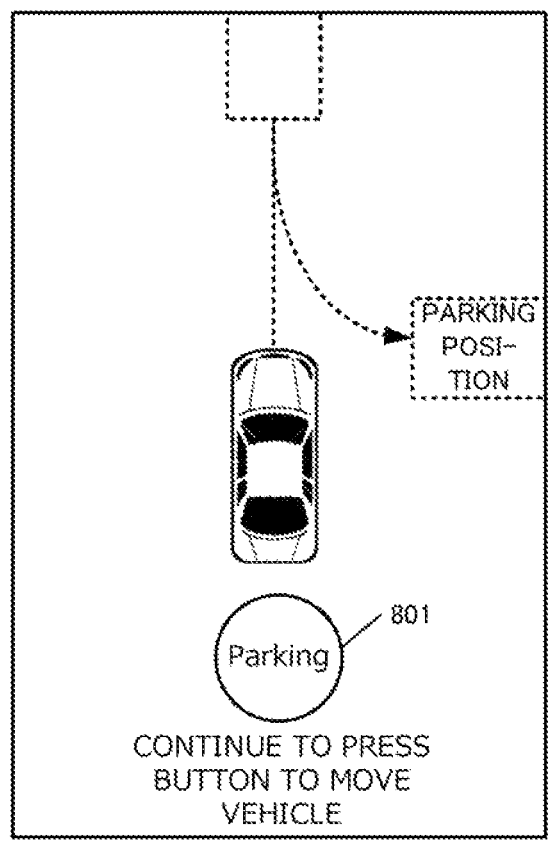
FIG. 8 illustrates an example of a screen provided on the user terminal.

FIG. 8 illustrates an example of the GUI provided on the user terminal 20. In this example, when the user continues pressing a button (reference sign 801), a movement instruction is periodically (for example, every 100 milliseconds) transmitted to the parking ECU 200A. The parking controller 2011 causes the vehicle 10 to move while the movement instruction is periodically received, and causes the vehicle 10 to stop when the reception of the movement instruction is stopped. Thereby, it is possible to cause safety confirmation by the user to be performed. Though the form of continuing pressing the button is exemplified in this example, an operation form is not limited thereto if the user's intention can be confirmed. For example, the movement instruction may be transmitted when the user continues swiping on a predetermined area on the screen.

Sensor data about a situation of the vehicle 10 is periodically transmitted from the parking ECU 200A to the user terminal 20. The sensor data may include, for example, video acquired by an in-vehicle camera and distance information acquired by the distance sensor. Thereby, for example, it becomes possible to output images around the vehicle 10 and distance information on the user terminal 20.

When the parking ECU 200A detects that the vehicle 10 has been parked at a predetermined position, an entry completion notification is transmitted to the user terminal 20 (step S17).

When the user performs an operation of ending remote parking, an end request is transmitted from the user terminal 20 to the DCM 100 (step S18). Further, the DCM 100 ends the wireless connection with the user terminal 20 and returns the mode to the client mode (step S19).

As described above, there may be a case where remote parking is started after the vehicle 10 arrives at a predetermined place (for example, the parking lot of the home). In such a case, if the DCM 100 connects to an access point, the DCM 100 has to be disconnected from the home network and newly connect to the user terminal 20. That is, a problem occurs that it is not possible to connect to the user terminal 20 at once, and waiting time occurs.

Therefore, the DCM 100 according to the present embodiment performs switching to the server mode beforehand so that automatic connection to an access point is not performed.

Further, after the vehicle 10 stops, the DCM 100 performs switching to the client mode on condition that use of the remote parking function ends or that standby for connection from the user terminal 20 times out.

Figure 9:
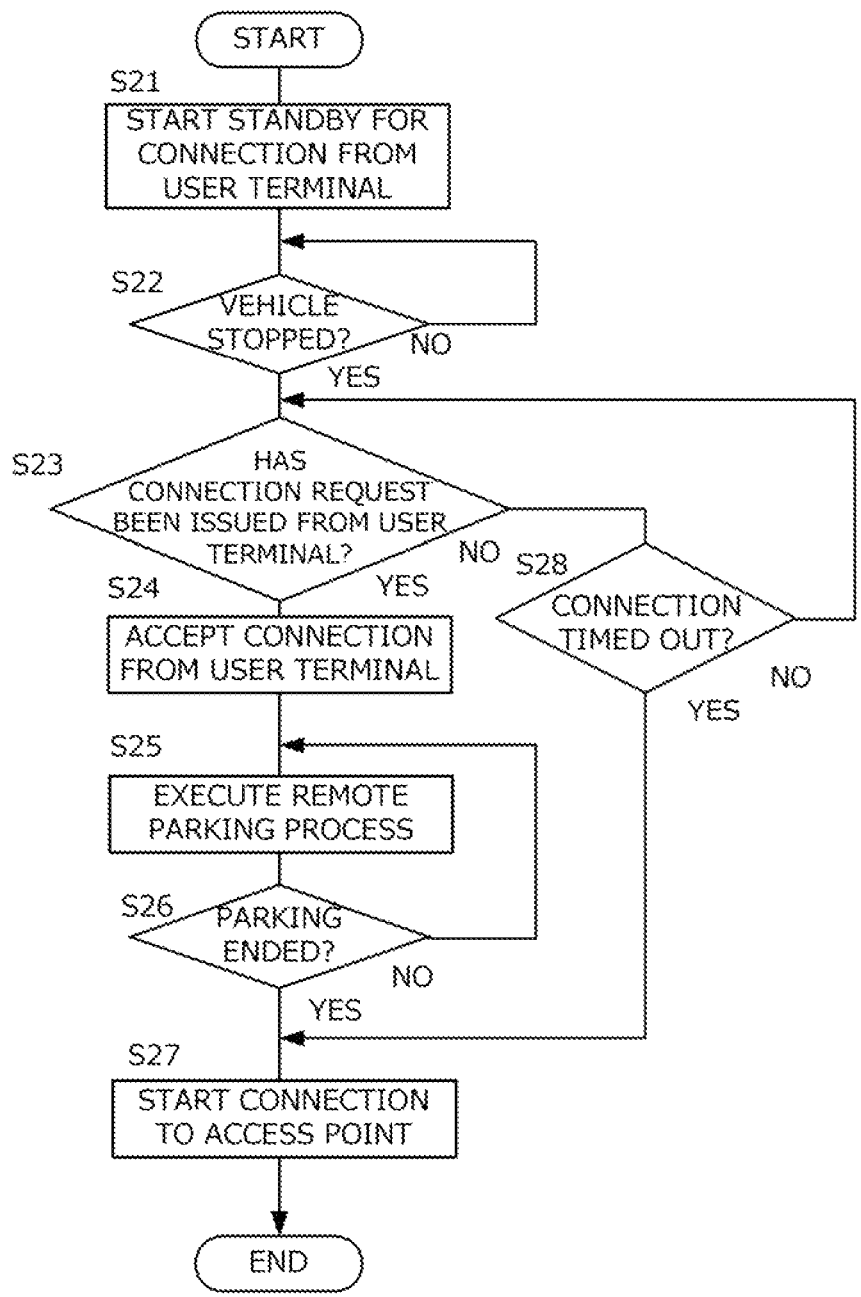
FIG. 9 is a flowchart of a remote parking process in the first embodiment.

FIG. 9 is a flowchart of a process executed by the DCM 100 and the parking ECU 200A. The illustrated process is started by the DCM 100 at a timing when the vehicle 10 starts traveling. The timing to start the process is not limited thereto if the timing is after a travel system of the vehicle 10 is started.

First, at step S21, the wireless connection controller 1011 starts standby for connection from the user terminal 20. Specifically, switching from the client mode to the server mode is performed, and standby for connection is started.

Next, at step S22, the wireless connection controller 1011 determines whether the vehicle 10 has stopped or not. Here, if a positive judgment is made, the process transitions to step S23. If a negative judgment is made, the wireless connection controller 1011 stands by until the vehicle 10 stops.

At step S23, the wireless connection controller 1011 determines whether a connection request has been issued from the user terminal 20 or not. Here, if a negative judgment is made, the process transitions to step S28. If a positive judgment is made, the process transitions to step S24.

At step S24, the wireless connection controller 1011 accepts connection from the user terminal 20 and establishes connection with the user terminal 20. This step corresponds to steps S13A to S14 in FIG. 7.

At step S25, the parking ECU 200A executes a remote parking process. At this step, a process as described at steps S15 and S16 in FIG. 7 is executed.

At step S26, it is determined whether parking has been completed or not. Here, if parking has been completed, the process transitions to step S27. If parking has not been completed, the process transitions to step S25, and the process is continued.

At step S27, the wireless connection controller 1011 starts connection to the local network. Specifically, switching from the server mode to the client mode is performed, and search for and connection to an access point is started.

If a negative judgment is made at step S23, the process transitions to step S28, and it is determined whether the connection request from the user terminal 20 times out or not. Here, if timeout has not occurred, the process returns to step S23. If timeout has occurred, the process transitions to step S27. That is, if a predetermined time elapses without remote parking being started, the wireless connection controller 1011 starts connection to the local network.

As described above, in the vehicle system according to the first embodiment, the DCM 100 prevents connection to a predetermined access point at least until a predetermined period elapses after the vehicle stops. Thereby, it becomes possible to accept a connection request from the user terminal 20 at once, and it becomes possible to quickly provide the remote parking function.

Modification of First Embodiment

In the first embodiment, the DCM 100 performs switching to the server mode beforehand to stand by for connection from the user terminal 20. Switching to the server mode, however, may be executed at a stage of detecting a sign that the vehicle 10 is going to be parked.

For example, switching to the server mode may be performed when it is detected that the vehicle 10 has entered an area corresponding to a predetermined parking lot.

The area corresponding to a predetermined parking lot is, for example, an area where remote parking is expected to be used. This area may be set by the user or may be automatically determined based on a history of use of remote parking in the past.

According to such a configuration, it becomes possible to perform communication via a local network (for example, a road-to-vehicle network provided around an intersection) while the vehicle 10 is traveling.

Switching to the server mode may be performed at a timing other than the above timing if the switching is performed at least before the vehicle 10 stops.

Second Embodiment

In the first embodiment, the DCM 100 performs switching to the server mode in advance before the vehicle 10 stops. In comparison, a second embodiment is an embodiment in which switching to the server mode is performed according to whether an access point registered beforehand has been detected or not.

The access point registered beforehand is an access point at which there is a possibility of conflict among wireless connections, for example, an access point connectable from a parking lot where the user uses the remote parking function. Such an access point may be automatically registered based on a parking history (or the remote parking function use history) of the vehicle 10 and an access point connection history.

Figure 10:
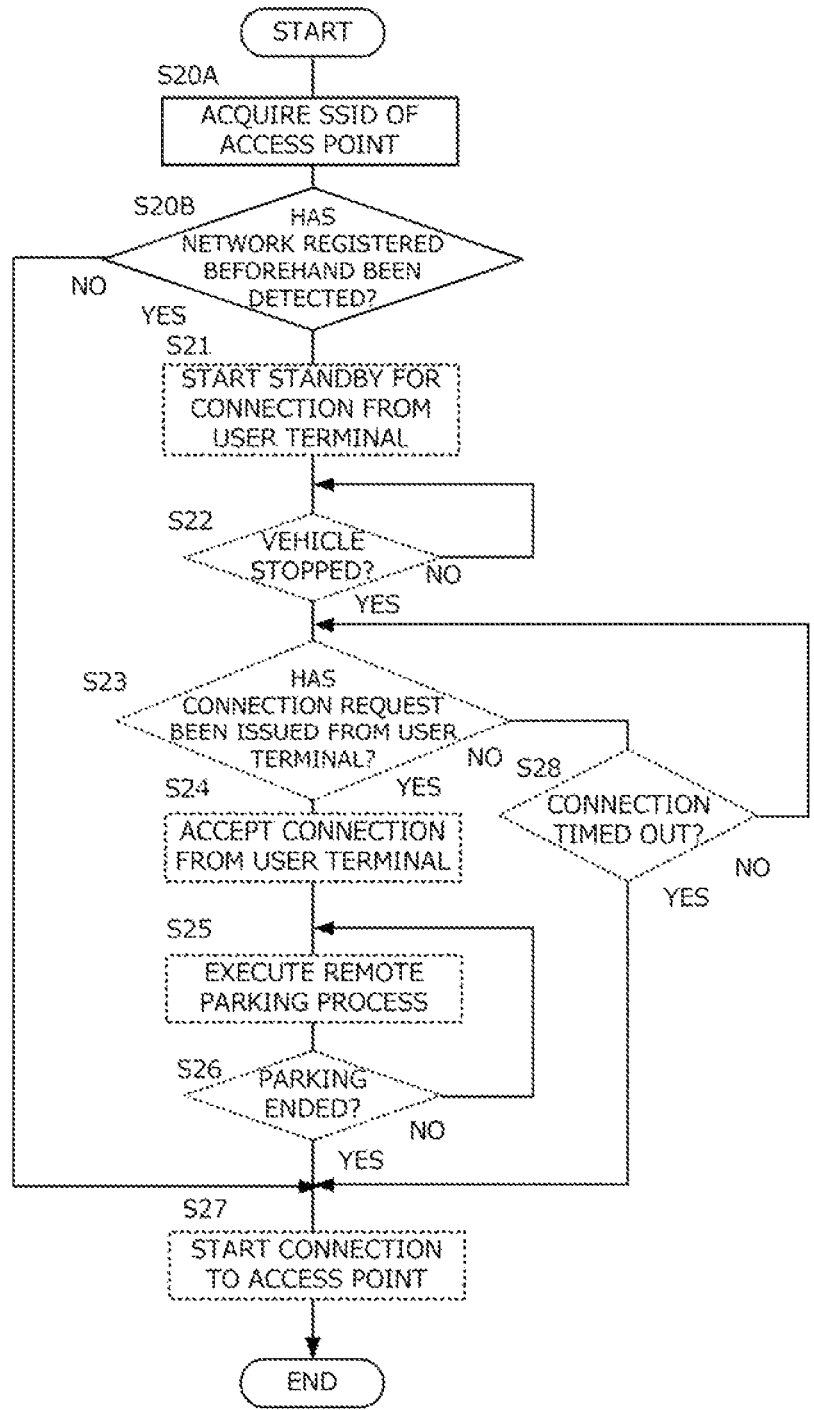
FIG. 10 is a flowchart of a remote parking process in a second embodiment.

FIG. 10 is a flowchart of a process executed by the DCM 100 and the parking ECU 200A in the second embodiment. The illustrated process is started when the DCM 100 detects an available access point.

At step S20A, the wireless connection controller 1011 acquires an identifier of an access point. For example, if the access point is such that uses a wireless LAN standard, the DCM 100 can acquire an SSID (service set identifier).

Next, at step S20B, the wireless connection controller 1011 determines whether the acquired SSID is such that has been already registered beforehand or not. Here, if the acquired SSID is such that has been registered beforehand, the process transitions to step S21, where a process similar to that of the first embodiment is started. If the acquired SSID is not such that has been registered beforehand, the process transitions to step S27, where connection to the access point is started.

As described above, switching to the server mode may be executed at a timing when an access point for which automatic connection is to be prevented is detected. In other words, prevention of automatic connection may be started at a timing when an access point for which automatic connection is to be prevented is detected.

(Modifications)

The embodiments described above are mere examples, and the present disclosure can be appropriately changed and practiced within a range not departing from the spirit thereof.

For example, the processes and units described in the present disclosure can be freely combined and implemented as far as technological contradiction does not occur.

In addition, the processing described as being performed by one device may be shared and executed by a plurality of devices. Alternatively, the processing described as being performed by different devices may be executed by one device. In a computer system, what hardware configuration (server configuration) realizes each function can be flexibly changed.

The present disclosure can also be realized by supplying a computer program including the functions described in the above embodiments to a computer and causing one or more processors included in the computer to read and execute the program. Such a computer program may be provided to the computer by a non-transitory computer-readable storage medium connectable to a system bus of the computer, or may be provided to the computer via a network. Examples of non-transitory computer readable storage media include: any type of disk such as a magnetic disk (floppy (registered trademark) disk, hard disk drive (HDD), etc.), an optical disk (CD-ROM, DVD disk, Blu-ray disk, etc.); and any type of medium suitable for storing electronic instructions, such as read-only memory (ROM), random access memory (RAM), EPROM, EEPROM, magnetic cards, flash memory, and optical cards.

What is claimed is:

1. An information processing apparatus for controlling wireless communication performed by a vehicle, the information processing apparatus comprising:
a controller comprising at least one processor configured to:
detect that the vehicle has entered an area corresponding to a predetermined parking lot;
based on detecting that the vehicle has entered the area, start prevention of a wireless connection with a predetermined access point that can be used at the predetermined parking lot;
based on starting the prevention of the wireless connection with the predetermined access point, determine whether the vehicle has stopped;
based on the vehicle having stopped, determine whether a connection request for performing remote parking control of the vehicle has been received from a user terminal;
based on receiving the connection request, establish the wireless connection with the user terminal;
based on establishing the wireless connection with the user terminal, transmit a start request of the remote parking control to the vehicle;
based on transmitting the start request, receive an end request of the remote parking control from the user terminal;
based on receiving the end request, end the wireless connection with the user terminal and end the prevention of the wireless connection with the predetermined access point;
based on ending the prevention of the wireless connection with the predetermined access point, search the predetermined access point; and
based on detecting the predetermined access point, establish the wireless connection with the predetermined access point.

2. The information processing apparatus according to claim 1, wherein the controller accepts the wireless connection from the user terminal during a first period from starting the prevention of the wireless connection with the predetermined access point until ending the prevention of the wireless connection with the predetermined access point.

3. The information processing apparatus according to claim 2, wherein, based on being connected with the user terminal, the controller performs the remote parking control based on an instruction transmitted from the user terminal.

4. The information processing apparatus according to claim 1, wherein the controller is operational in at least one of a client mode for performing the wireless connection to another apparatus or a server mode for accepting the wireless connection from another apparatus.

5. The information processing apparatus according to claim 4, wherein the controller operates in the server mode during a first period from starting the prevention of the wireless connection with the predetermined access point until ending the prevention of the wireless connection with the predetermined access point.

6. The information processing apparatus according to claim 5, wherein the controller transitions to the client mode based on the first period expiring.

7. The information processing apparatus according to claim 4, wherein the controller accepts the wireless connection from the user terminal while operating in the server mode.

8. The information processing apparatus according to claim 7, wherein, based on being connected with the user terminal, the controller performs the remote parking control based on an instruction transmitted from the user terminal.

9. The information processing apparatus according to claim 1, wherein
the controller stores an identifier of the predetermined access point; and
based on detecting an access point other than the predetermined access point, the controller performs connection to the access point without waiting for expiration of a first period from starting the prevention of the wireless connection with the predetermined access point until ending the prevention of the wireless connection with the predetermined access point.

10. The information processing apparatus according to claim 9, wherein the identifier is a service set identifier (SSID).

11. An information processing apparatus for controlling wireless communication performed by a vehicle, the information processing apparatus comprising:
a controller storing a first identifier of a first access point connectable from a predetermined parking lot and comprising at least one processor configured to:
acquire an identifier from at least one of a plurality of access points;
determine whether the acquired identifier is the first identifier of the first access point;
based on the acquired identifier being the first identifier of the first access point, start prevention of a wireless connection with the first access point;
based on starting the prevention of the wireless connection with the first access point, determine whether a connection request for performing remote parking control of the vehicle has been received from a user terminal;
based on receiving the connection request, establish the wireless connection with the user terminal;
based on establishing the wireless connection with the user terminal, transmit a start request of the remote parking control to the vehicle;
based on transmitting the start request, receive an end request of the remote parking control from the user terminal;
based on receiving the end request, end the wireless connection with the user terminal and end the prevention of the wireless connection with the first access point; and
based on ending the prevention of the wireless connection with the first access point, establish the wireless connection with the first access point.

12. The information processing apparatus according to claim 11, wherein the controller accepts the wireless connection from the user terminal during a first period from starting the prevention of the wireless connection with the first access point until ending the prevention of the wireless connection with the first access point.

13. The information processing apparatus according to claim 12, wherein, based on being connected with the user terminal, the controller performs the remote parking control based on an instruction transmitted from the user terminal.

14. The information processing apparatus according to claim 11, wherein
based on the acquired identifier identifying an access point other than the first access point, the controller performs connection to the access point without waiting for expiration of a first period from starting the prevention of the wireless connection with the first access point until ending the prevention of the wireless connection with the first access point.

15. The information processing apparatus according to claim 14, wherein the acquired identifier is a service set identifier (SSID).

16. An information processing method executed by an information processing apparatus for controlling wireless communication performed by a vehicle, the information processing method comprising:
detecting that the vehicle has entered an area corresponding to a predetermined parking lot;
based on detecting that the vehicle has entered the area, starting prevention of a wireless connection with a predetermined access point that can be used at the predetermined parking lot;
based on starting the prevention of the wireless connection with the predetermined access point, determining whether the vehicle has stopped;
based on the vehicle being stopped, determining whether a connection request for performing remote parking control of the vehicle has been received from a user terminal;
based on receiving the connection request, establishing the wireless connection with the user terminal;
based on establishing the wireless connection with the user terminal, transmitting a start request of the remote parking control to the vehicle;
based on transmitting the start request, receiving an end request of the remote parking control from the user terminal;
based on receiving the end request, ending the wireless connection with the user terminal and ending the prevention of the wireless connection with the predetermined access point;
based on ending the prevention of the wireless connection with the predetermined access point, searching the predetermined access point; and
based on detecting the predetermined access point, establishing the wireless connection with the predetermined access point.

17. The information processing apparatus according to claim 1, wherein, based on the connection request has not been received, the controller determines whether the connection request from the user terminal times out, and
wherein, based on the connection request from the user terminal times out, the controller ends the prevention of the wireless connection with the predetermined access point.

* * * * *